(12) United States Patent
Hofmeister et al.

(10) Patent No.: US 11,639,598 B2
(45) Date of Patent: May 2, 2023

(54) MOUNTING ASSEMBLIES AND METHODS FOR DISPOSER INSTALLATION

(71) Applicant: INSINKERATOR LLC, Benton Harbor, MI (US)

(72) Inventors: Dane Hofmeister, Mount Pleasant, WI (US); Kevin McClory, Pleasant Prairie, WI (US); Matt Sandoval, Waukesha, WI (US); Ron Bauer, Racine, WI (US); Mohammad Hossein Ansari, Oak Creek, WI (US); Eric Schultz, Thiensville, WI (US); Mark T. Cammarota, Milwaukee, WI (US)

(73) Assignee: INSINKERATOR LLC, Benton Harbor, MI (US)

( * ) Notice: Subject to any disclaimer, the term of this patent is extended or adjusted under 35 U.S.C. 154(b) by 148 days.

(21) Appl. No.: 17/036,667

(22) Filed: Sep. 29, 2020

(65) Prior Publication Data

US 2021/0095448 A1 Apr. 1, 2021

Related U.S. Application Data

(60) Provisional application No. 62/907,982, filed on Sep. 30, 2019.

(51) Int. Cl.
*E03C 1/266* (2006.01)

(52) U.S. Cl.
CPC .................. *E03C 1/2665* (2013.01)

(58) Field of Classification Search
CPC ...................................... E03C 1/2665
(Continued)

(56) References Cited

U.S. PATENT DOCUMENTS 2,877,955 A * 3/1959 Bebinger ............... E03C 1/2665
310/78
3,013,736 A * 12/1961 Pontis ................... E03C 1/2665
241/296
(Continued)

FOREIGN PATENT DOCUMENTS

CN 2920403 Y 7/2007
CN 204849948 U 12/2015
(Continued)

OTHER PUBLICATIONS

PCT/US2020/053278 International Search Report and Written Opinion of the International Searching Authority dated Dec. 3, 2020 (13 pages).
(Continued)

*Primary Examiner* — Lori L Baker
(74) *Attorney, Agent, or Firm* — Amundsen Davis, LLC

(57) ABSTRACT

Mounting assemblies for waste disposers such as food waste disposers, waste disposers employing such mounting assemblies, and related methods are disclosed herein. Mounting assemblies include an engagement feature having a first engagement structure located on the body flange and a second engagement structure located on the upper portion of the disposer body. When the engagement feature is in the engaged position, the body flange and the disposer body are engaged, forming a combined disposer and body flange assembly. The combined disposer and body flange assembly can be lifted into alignment with the strainer flange assembly and rotated as a unit to engage the body flange with the mounting flange.

22 Claims, 21 Drawing Sheets

(58) Field of Classification Search
USPC .................................... 241/46.014, 46.013
See application file for complete search history.

(56) References Cited

U.S. PATENT DOCUMENTS

| | | | | |
|---|---|---|---|---|
| 3,141,622 | A * | 7/1964 | Yartz .................. | E03C 1/266 |
| | | | | 241/46.17 |
| 3,181,802 | A * | 5/1965 | Lung ................... | E03C 1/2665 |
| | | | | 241/46.016 |
| 3,436,027 | A * | 4/1969 | Sherman, Jr. ......... | E03C 1/2665 |
| | | | | 241/36 |
| 9,139,990 | B2 | 9/2015 | Bennage | |
| 9,267,626 | B2 | 2/2016 | Falcone et al. | |
| 11,306,467 | B2 | 4/2022 | Paweleck et al. | |
| 2003/0094521 | A1* | 5/2003 | Jara-Almonte ....... | E03C 1/2665 |
| | | | | 241/46.013 |
| 2004/0178288 | A1* | 9/2004 | Berger ................. | E03C 1/2665 |
| | | | | 241/46.014 |
| 2006/0038047 | A1* | 2/2006 | Anderson .............. | E03C 1/262 |
| | | | | 241/46.013 |
| 2008/0301871 | A1 | 12/2008 | Hanson et al. | |

FOREIGN PATENT DOCUMENTS

| | | |
|---|---|---|
| CN | 204849956 U | 12/2015 |
| CN | 206328825 U | 7/2017 |
| CN | 108678097 | 10/2018 |
| DE | 4110676 A1 | 10/1992 |
| DE | 19607986 A1 | 9/1997 |
| EP | 2816162 A1 | 12/2014 |
| WO | 2019/191183 | 10/2019 |

OTHER PUBLICATIONS

Anaheim Manufacturing, "Food Waste Disposer Owner's Guide," brochure, 560C485PO1 Rev A, 24 pages, www.anaheimmfg.com (admitted to be prior art and to have been publicly available at least as of Aug. 6, 2013).
PCT/US2019/024210 International Search Report and Written Opinion of the International Searching Authority dated Jul. 22, 2019 (14 pages).
Communication Pursuant to Rules 161(1) and 162 from the European Patent Office for Application No. 20793853.1 dated Apr. 6, 2022 (3 pages).

* cited by examiner

MOUNTING ASSEMBLIES AND METHODS FOR DISPOSER INSTALLATION

RELATED APPLICATIONS

This application claims the benefit of U.S. Provisional Patent Application No. 62/907,982, filed on Sep. 30, 2019, the disclosure of which is hereby incorporated in its entirety.

FIELD OF THE INVENTION

The present disclosure relates to waste disposers, such as food waste disposers, and methods of mounting such waste disposers in relation to other structures such as sinks and, more particularly, to waste disposer assemblies or mounting assemblies of or for such waste disposers, and methods of mounting such waste disposers in relation to other structures such as sinks, by way of such waste disposer assemblies or mounting assemblies.

BACKGROUND

Food waste disposers are used to comminute food scraps into particles small enough to pass through household drain plumbing. Referring to FIG. 1 (Prior Art), a conventional food waste disposer 10 is often mounted to a sink, such as a kitchen sink (not shown), and includes a food conveying section 12, a motor section 14, and a grinding section 16 disposed between the food conveying section and the motor section. The food conveying section 12 includes a housing 18 that forms an inlet for receiving food waste and water. The food conveying section 12 conveys the food waste to the grinding section 16, and the motor section 14 includes a motor imparting rotational movement to a motor shaft to operate the grinding section.

Conventional food waste disposers such as the food waste disposer 10 can be installed to a sink in a two-step procedure using a mounting assembly 100, an example of which is shown in FIG. 1 in an exploded manner relative to the food waste disposer. First, a sink flange assembly 102, which includes a strainer flange 104, a sink gasket 106, a back-up flange 108, an upper mounting flange 110, bolts 112, and a retaining ring 114 are installed or mounted in relation to the sink (which again is not shown in FIG. 1). Second, a disposer assembly 30 including the food waste disposer 10 and also including a mounting (or sealing) gasket 116 and a body flange (also sometimes refereed to as a lower mounting flange) 118 are attached to the sink flange assembly 102. The combination of the disposer assembly 30 and the mounting assembly 100 can be considered to constitute an overall food waste disposer assembly 150.

More particularly with respect to the attachment of the disposer assembly 30 to the sink flange assembly 102, it should be understood that the body flange 118 is placed around the lip 12 of the disposer housing 18, which forms the inlet of the food conveying section. The mounting gasket 116 is then placed around that inlet as well, above the body flange 118, in a manner tending to secure the mounting gasket 116 to the inlet, by virtue of a lip 12 at the inlet of the disposer housing 18. Attachment of the disposer assembly 30 including the food waste disposer 10 to the sink flange assembly 102 and thereby to the sink is then particularly achieved by engaging mounting tabs 120 of the body flange 118 with ramps (or inclined mounting fasteners or edges or ridges) 122 of the upper mounting flange 110 and then rotating the body flange 118 relative to the upper mounting flange 110 until secure. When the body flange 118 and upper mounting flange 110 are secured together, the mounting gasket 116 is compressed therebetween, and provides a seal between the sink flange and inlet.

U.S. Pat. No. 913,990 describes another mounting assembly for a waste disposer. With reference to FIG. 2, the mounting assembly described therein consists of a strainer flange assembly 202, mounting gasket 216, and a body flange 300. The strainer flange assembly 202 is installed in the sink drain opening and consists of the strainer flange 204, fiber gasket 206, back up flange 208, mounting flange 210, retaining ring 214, and three bolts 212. The strainer flange 204 is inserted into the sink drain opening. The three bolts 212 are inserted into the three threaded holes on the mounting flange 210 with the stud end of the bolt 212 projecting upwards. The back up flange and mounting flange 210 with bolts are positioned around the tubular portion of the strainer flange that extends beneath the sink. The retaining ring is inserted into the groove on the strainer flange to support the backup and mounting flanges. The stud end of each of the bolts 212 contacts the lobes of the back up flange. The bolts are tightened, forcing the backup flange into contact with the bottom of the sink.

An alternate configuration of the strainer flange assembly is described in PCT Application No. PCT/US19/24210. In that application, instead of using a retaining ring that engages with a groove on the exterior of the strainer flange to support the mounting flange, the exterior of the strainer flange has a plurality of protrusions. The inner diameter of the mounting flange has a plurality of cut outs and tabs. To install the mounting flange on the strainer flange, the cutouts on the mounting flange are aligned with the protrusions on the strainer flange and the mounting flange is displaced vertically towards the sink bottom when the protrusions pass through the cutouts. Once the mounting flange is above the protrusions, the mounting flange is rotated to bring the tabs over the strainer flange protrusions. Once in this alignment, the mounting flange is supported by the protrusions and the bolts can be tightened to secure the back up flange as described in U.S. Pat. No. 913,990.

With reference to FIG. 2, for installation as described in either U.S. Pat. No. 913,990 or PCT Application No. PCT/US19/24210, the body flange 300 is placed around the disposer throat and the mounting gasket 216 is secured to the lip of the disposer housing (not shown). The installer then aligns the top of the mounting gasket 216 with the bottom opening of the strainer flange 204 and holds the disposer in that position with one hand. With the other hand, the installer then rotates the body flange 300 about the disposer throat until the three tabs 220 on the body flange 300 engage the ramps 222. Continued rotation of the body flange 300 will force the tabs further up the ramps and begin to compress the mounting gasket 216. Once the tabs are partially engaged onto the ramps, the disposer is supported by the ramps and the installer no longer has to support the disposer weight. At this point, the installer can then use both hands and/or a tool to complete the installation by forcing the tabs 220 to the ends of the ramps 222. At that fully engaged position, the mounting gasket will be fully compressed between the bottom opening of the strainer flange 204 and the lip of the container body throat creating a seal that prevents leaking and the disposer will be secured to the strainer flange assembly. As described in U.S. Pat. No. 913,990, there can be V-shaped notches 301 in the body flange 300, which are intended to prevent the disposer from being installed if any one of the tabs 220 is not engaged with a ramp 222 as the installer begins to rotate the body flange 300.

Although food waste disposers have been successfully installed in relation to sinks in the manner described above (or in similar manners), there remain difficulties associated with the installation process that can make the process undesirably challenging or inconvenient for some individuals who are performing that process. For example, the installer still has to support the disposer weight with one hand while engaging the body flange and mounting flange with the other hand. Food waste disposers can tend to weigh up to about 18 pounds and can be bulky and difficult to support with one hand. The installer is typically working in the cabinet space under a sink which is cramped and does not have room for another person to assist in the installation of the disposer. There have been various tools developed to help with the installation of a disposer, such as jacks. However, many food waste disposers are installed by home owners or non-professionals who may only install a disposer once every 7-10 years and do not invest in specialized tools for the occasional need.

Accordingly, it would be desirable if an improved waste disposer assembly, and/or an improved mounting assembly of or for such a waste disposer assembly, and/or an improved method of installing or mounting such a waste disposer assembly or mounting assembly in relation to another structure such as a sink, could be developed that alleviated or addressed one or more of the above-discussed concerns associated with conventional waste disposer assemblies, or alleviated or addressed one or more other concerns or disadvantages, or provided one or more advantages by comparison with conventional arrangements.

BRIEF SUMMARY

In at least some example embodiments, the present disclosure relates to mounting assemblies for waste disposers, such as food waste disposers, waste disposers employing such mounting assemblies, and related methods of installing waste disposers.

Mounting assemblies disclosed herein for mounting a waste disposer include an engagement feature having a first engagement structure located on a body flange and a second engagement structure located on an upper portion of a disposer body. Engagement features may optionally include a third engagement structure located on the body flange. Engagement features have an engaged position in which the body flange and the disposer body are engaged and are rotatable as a unit, and a disengaged installed position in which the disposer body is rotatable independently of the body flange.

Waste disposer assemblies disclosed herein include a waste disposer and a mounting assembly. The waste disposer has a disposer body that includes an upper portion and a lower portion. The mounting assembly includes an engagement feature having a first engagement structure located on a body flange and a second engagement structure located on an upper portion of a disposer body. The engagement feature has an engaged position in which the body flange and the disposer body are engaged and are rotatable as a unit, and a disengaged installed position in which the disposer body is rotatable independently of the body flange.

Methods of assembling a mounting assembly for use in mounting a waste disposer include a first step of providing a mounting assembly comprising an engagement feature, the engagement feature comprising a first engagement structure located on a body flange and a second engagement structure located on an upper portion of a disposer body. Such methods also include a second step of placing the engagement feature in an engaged position in which the body flange and the disposer body are engaged and are rotatable as a unit. Such methods also include a third step of rotating the disposer body through a first degree of rotation with the engagement feature in the engaged position. Such methods further include a fourth step of transitioning the engagement feature from the engaged position to a disengaged installed position. The fourth step may be performed by rotating the disposer body through a second degree of rotation.

BRIEF DESCRIPTION OF THE DRAWINGS

Embodiments of waste disposer assemblies, mounting assemblies of or for such waste disposer assemblies, and related methods are disclosed with reference to the accompanying drawings and are for illustrative purposes only. The waste disposer/mounting assembly apparatuses and methods encompassed herein are not limited in their applications to the details of construction, arrangements of components, or other aspects or features illustrated in the drawings, but rather such apparatuses and methods encompassed herein include other embodiments or are capable of being practiced or carried out in other various ways. Like reference numerals are used to indicate like components.

DETAILED DESCRIPTION

Figure 3:
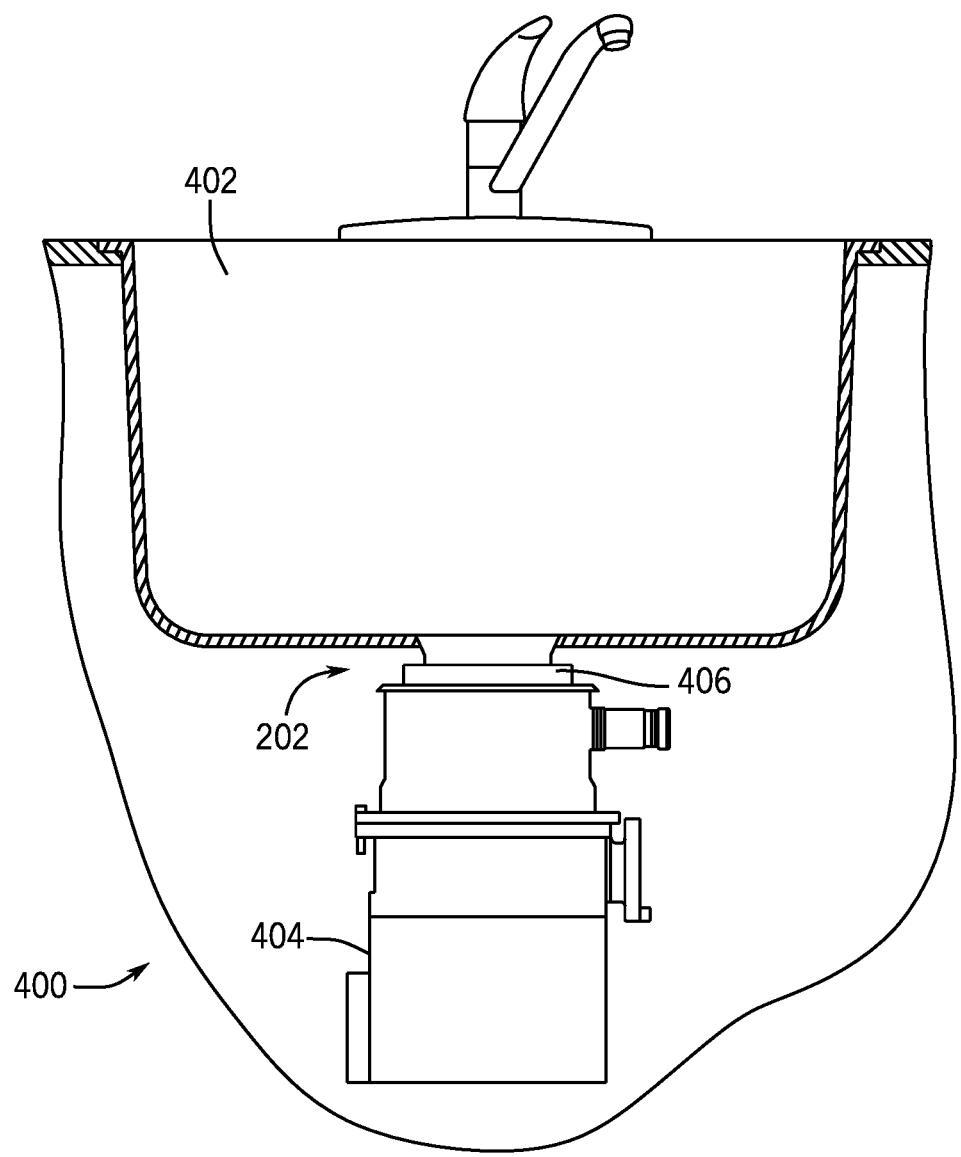
FIG. 3 is a partly cross-sectional, partly front elevation view of one example of a waste disposer assembly of the present technology installed on a sink.

Referring to FIG. 3, one example of a waste disposer assembly 400 of the present technology is installed or mounted in relation to a sink 402. Although FIG. 3 shows a side elevation view of the food waste disposer assembly 400, FIG. 3 provides a cutaway cross-sectional view of the sink 402, so as to better illustrate how the waste disposer assembly 400 is installed relative to the sink 402. The waste disposer assembly 400 includes a waste disposer 404 and a mounting assembly 406 of the present technology that allows for the waste disposer 404 to be attached to the sink 402, such that the waste disposer 404 is positioned beneath the sink 402. As shown, the waste disposer assembly is attached to the strainer flange assembly 202 of sink 402.

Figure 4:
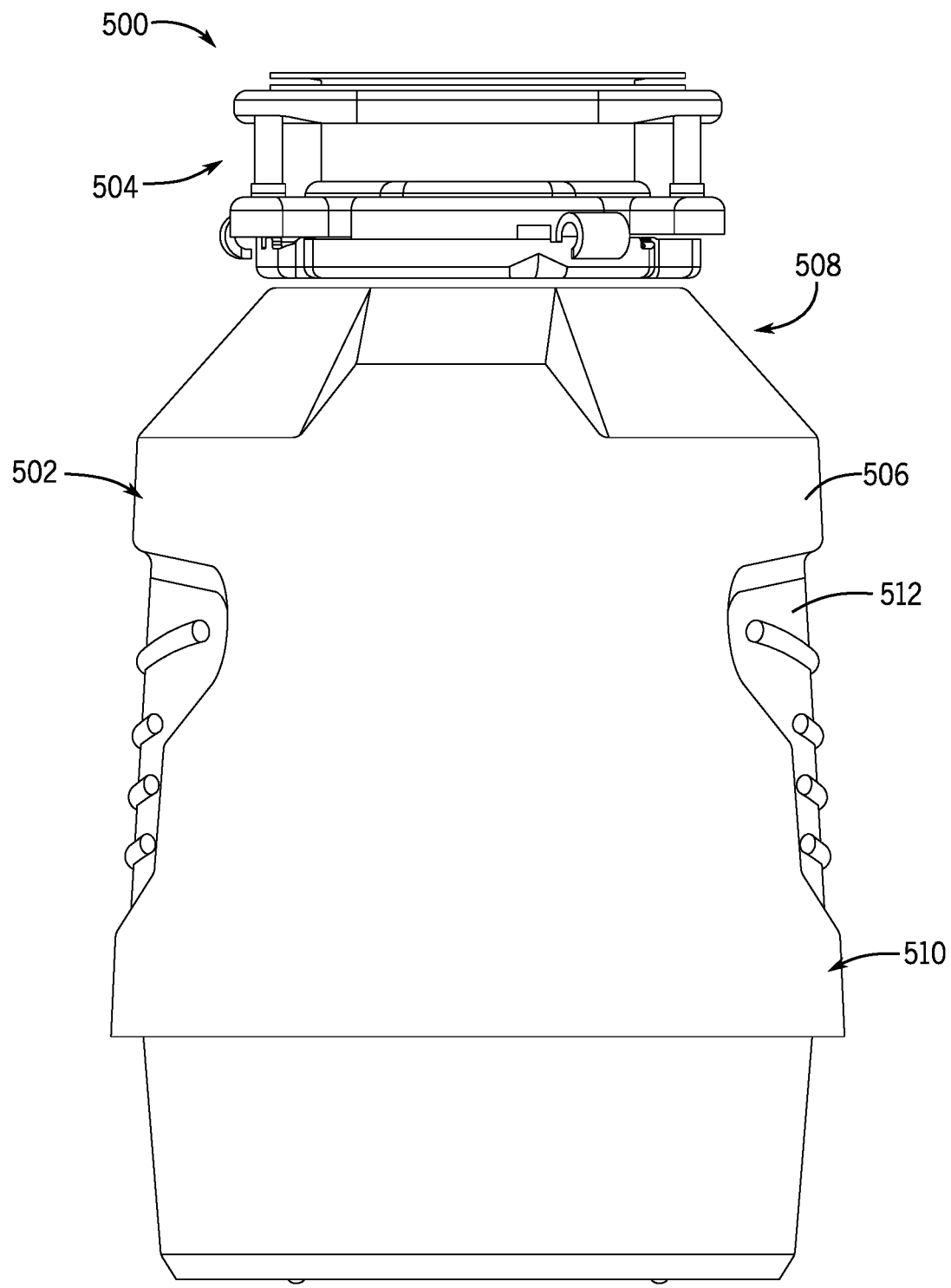
FIG. 4 is an isometric view of another example of a waste disposer assembly of the present technology.

FIG. 4 illustrates one example of a waste disposer assembly 500 of the present technology, which includes a waste disposer 502 and a mounting assembly 504. The waste disposer 502 has a disposer body 506 that includes an upper portion 508 and a lower portion 510. The lower portion 510 of the disposer body 506 may include one or more grips 512 that may be used by an installer to grip the waste disposer 502 to facilitate the lift and rotate motion described above.

It is noted that some examples of waste disposers include a trim shell, while others do not. For purposes of this disclosure, the trim shell is considered to be part of the waste disposer, and references herein to the "disposer body" include the trim shell for embodiments in which the waste disposer has a trim shell.

Generally, mounting assemblies of the present technology, such as mounting assembly 406 or 504, include an engagement feature that has an engaged position and a disengaged installed position. When the engagement feature is in the engaged position, the body flange and the disposer body are engaged and are rotatable as a unit. The engagement feature may include a first engagement structure located on the body flange and a second engagement structure located on the upper portion of the disposer body. The first engagement structure on the body flange may interact with the second engagement structure on the upper portion of the disposer body to engage the body flange with the disposer body. When the body flange and the disposer body are engaged by the engagement feature, the combined disposer and body flange assembly can be lifted into alignment with the strainer flange assembly and rotated as a unit to engage the body flange with the mounting flange. Since the disposer and body flange rotate together as a unit initially, the installer can use both hands to lift and rotate the disposer/body flange assembly, thus making it easier for the installer.

The engagement feature may be configured to provide temporary engagement between the body flange and the disposer body. The engagement feature may be configured such that the temporary engagement automatically disengages. For example, the engagement feature may be configured to maintain the engaged position during a first degree of rotation of the disposer body, and transition from the engaged position to the disengaged installed position upon a second degree of rotation of the disposer body. As one such example, in waste disposer assemblies having mounting flange ramps, such as ramps 122 or 222 described above, once the body flange tabs have engaged with the mounting flange ramps, the disposer will be supported on the mounting flange ramps. As the body flange tabs travel up the mounting flange ramps, the first and second engagement structures of the body flange and the disposer body may automatically separate, causing the engagement feature to transition to its disengaged installed position, in which the disposer body is rotatable independently of the body flange. The disposer body can then be rotated to align the plumbing and the engagement of the body flange with the mounting flange into the locked position completed. As another example, the engagement feature may include a keyed coupling between the body flange and the disposer which disengages automatically based on the increase of required torque to turn the unit during the install. The coupling between the body and the flange could be a component that shears off or flexes to automatically disengage so the plumbing can be aligned. Alternatively, the engagement feature may not automatically disengage. For example, the engagement feature may include a keyed coupling pin, or other coupling device, between the body flange and disposer that would not disengage automatically. Once the disposer is hung, the key, pin, or other coupling device could be manually removed so the plumbing could be aligned by turning the disposer.

Figure 5:
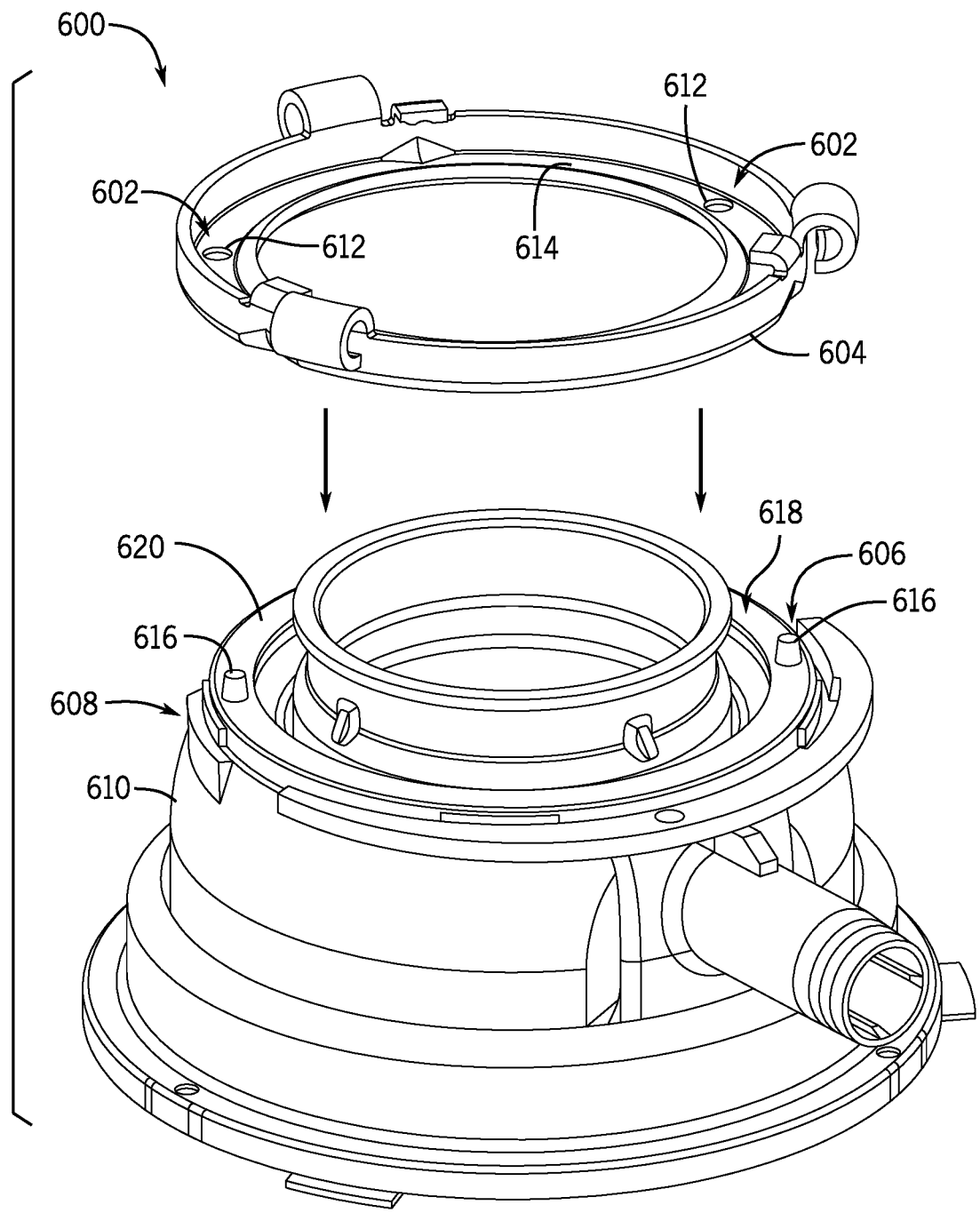
FIG. 5 illustrates an exploded view of one example of an engagement feature of the present technology, prior to engagement of the engagement feature.
Figure 6:
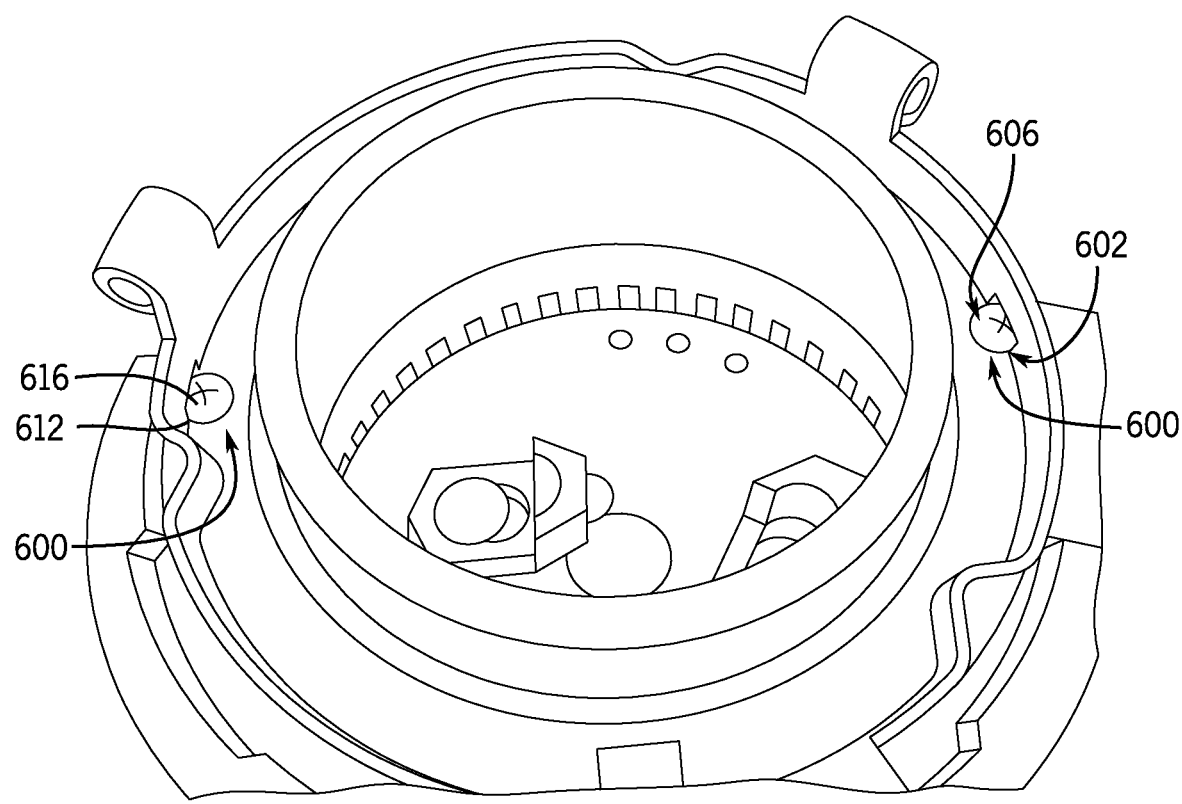
FIG. 6 illustrates the engagement feature of FIG. 5, in its engaged position.

FIGS. 5 and 6 illustrate one example of an engagement feature 600 of the present technology. The engagement feature 600 includes first engagement structure 602 located on the body flange 604 and a second engagement structure 606 located on the upper portion 608 of the disposer body 610.

The first engagement structure 602 includes one or more holes 612 provided in a bottom surface 614 of the body flange 604. In the illustrated example, the first engagement structure 602 includes two holes. The bottom surface 614 of the body flange 604 has a circumference, and the two holes 612 are spaced apart along the circumference of the bottom surface 614 of the body flange 604 at an angle about 180°. In other examples, the first engagement structure 602 may include any suitable number of holes, such as one hole, three holes, or a different plurality of holes. Each hole may be spaced apart from any other hole at any suitable angle, including an angle of less than about 180°. Each of the holes 612 is shown as being circular, but may have any suitable shape, and may be slots or other configurations. The shape of each of the holes 612 may be the same as or different from any of the other holes 612.

The second engagement structure 606 includes one or more protrusions 616 provided on the upper portion 608 of the disposer body 610. The upper portion 608 of the disposer body 610 may include a body flange support collar 618 having top surface 620, and each protrusion 616 of the second engagement structure 606 may extend upwardly from the top surface 620 of the body flange support collar

618. Each protrusion 616 may be formed and secured to the top surface 620 of the body flange support collar 618 in any suitable manner. For example, in FIG. 6, each protrusion 616 is formed by hardware, such as a screw or bolt. The number, spacing, and shape of each protrusion 616 of the second engagement structure 606 should be selected to align with a corresponding hole 612 of the first engagement structure 602. The bottom surface 614 of the body flange 604 may abut the top surface 620 of the body flange support collar 618 when the engagement feature 600 is in the engaged position.

FIG. 6 illustrates engagement feature 600 in its engaged position. The first engagement structure 602 is aligned with and receives the second engagement structure 606. Specifically, each hole 612 of the first engagement structure 602 is aligned with and receives one of the protrusions 616 of the second engagement structure 606.

In an alternative embodiment, the protrusions and holes may be reversed, with the first engagement structure 602 including protrusions and the second engagement structure including holes. The design and operation of such an engagement feature would be the reverse of engagement feature 600.

Figure 7:
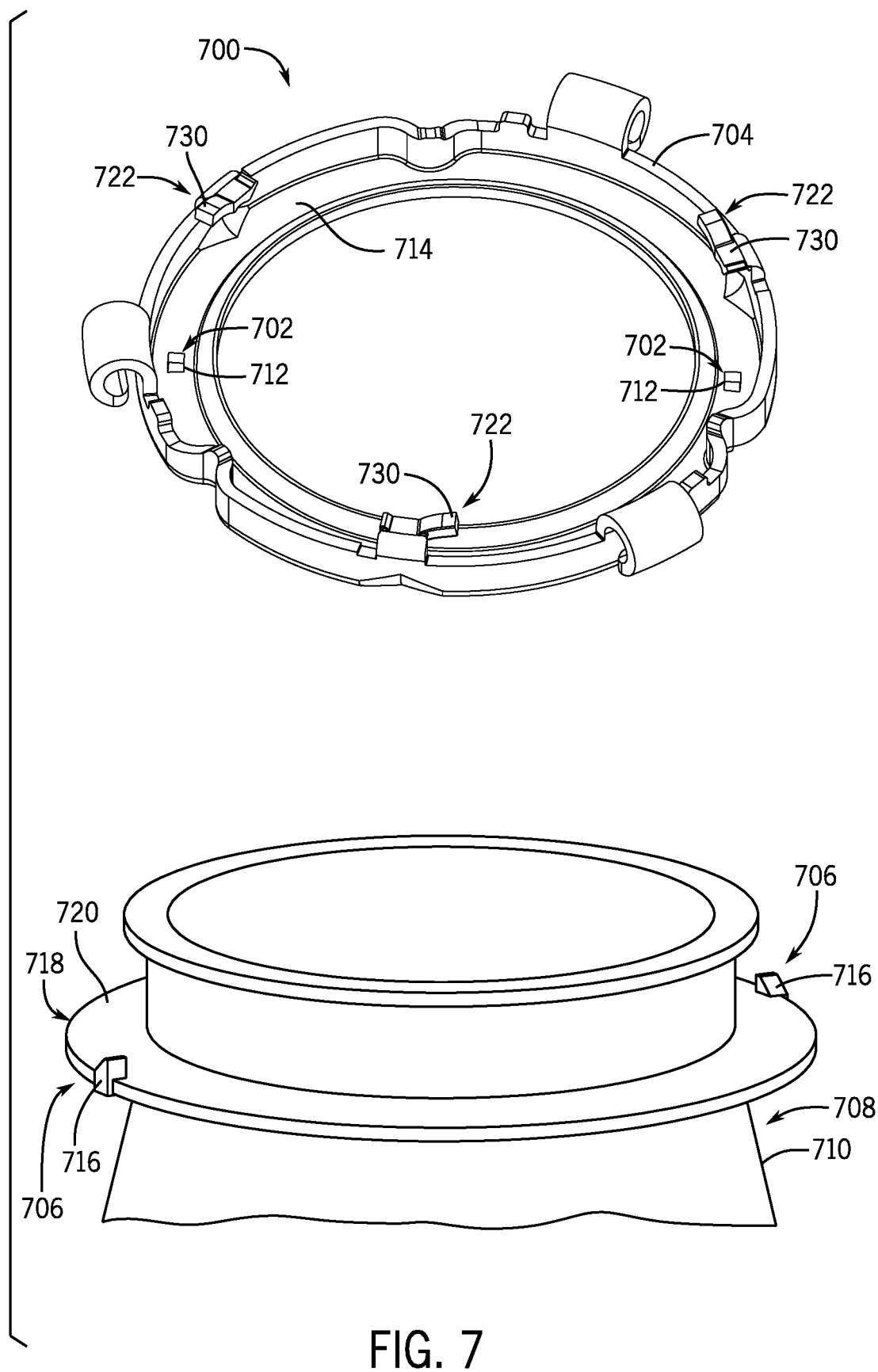
FIG. 7 illustrates an exploded view of a second example of an engagement feature of the present technology, prior to engagement of the engagement feature.

FIG. 7 illustrates an example of an engagement feature 700 of the present technology. The engagement feature 700 includes first engagement structure 702 located on the body flange 704 and a second engagement structure 706 located on the upper portion 708 of the disposer body 710. The engagement feature 700 also includes a third engagement structure 722, which is an optional structure that can be used in embodiments where the waste disposer assembly has mounting flange ramps, such as ramps 122 or 222 described above.

The first engagement structure 702 includes one or more holes 712 provided in a bottom surface 714 of the body flange 704. In the illustrated example, the first engagement structure 702 includes two holes 712. The bottom surface 714 of the body flange 704 has a circumference, and the two holes 712 are spaced apart along the circumference of the bottom surface 714 of the body flange 704 at an angle about 180°. In other examples, the first engagement structure 702 may include any suitable number of holes, such as one hole, three holes, or a different plurality of holes. Each hole may be spaced apart from any other hole at any suitable angle, including an angle of less than about 180°. Each of the holes 712 is shown as being a generally rectangular punch-out tab, but may have any suitable shape, and may be circular, slots, punch-out tabs or other configurations. The shape of each of the holes 712 may be the same as or different from any of the other holes 712.

The second engagement structure 706 includes one or more protrusions 716 provided on the upper portion 708 of the disposer body 710. The upper portion 708 of the disposer body 710 may include a body flange support collar 718 having top surface 720, and the second engagement structure may extend above the top surface 720 of the body flange support collar 718. The bottom surface 714 of the body flange 704 may abut the top surface 720 of the body flange support collar 718 when the engagement feature 700 is in the engaged position. The number, spacing, and shape of each protrusion 716 of the second engagement structure 706 should be selected to align with a corresponding hole 712 of the first engagement structure 702.

Figure 8:
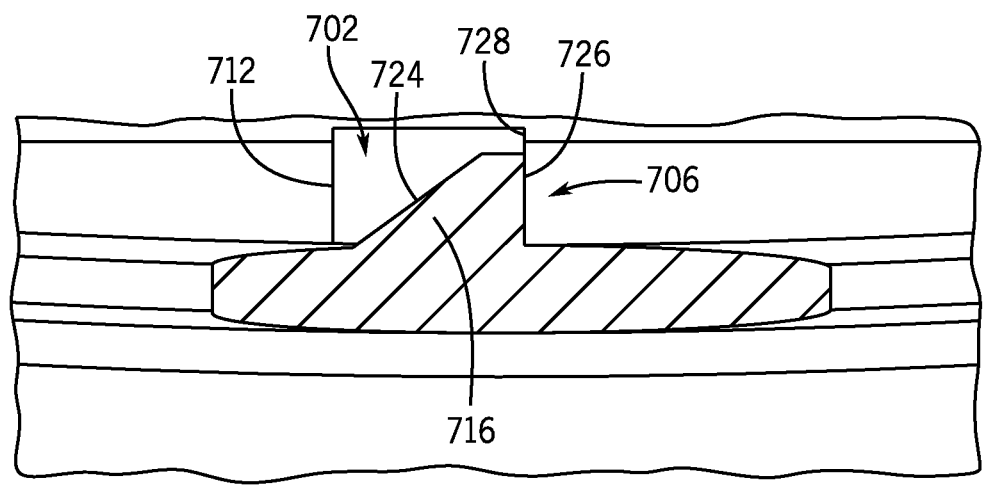
FIG. 8 illustrates the relative positions of one hole of the first engagement structure and one protrusion of the second engagement structure when the engagement feature of FIG. 7 is in its engaged position.

FIG. 8 illustrates the relative positions of one hole 712 of the first engagement structure 702 and one protrusion 716 of the second engagement structure 706 when the engagement feature 700 is in its engaged position. Referring to FIGS. 7 and 8, in the illustrated example, each protrusion 716 in in the form of a one-way tab, having a sloped upper surface 724 and a protrusion side wall 726. The protrusion side wall 726 of the abuts the hole side wall 728 of the hole 712 when the engagement feature 700 is in its engaged position.

Figure 1:
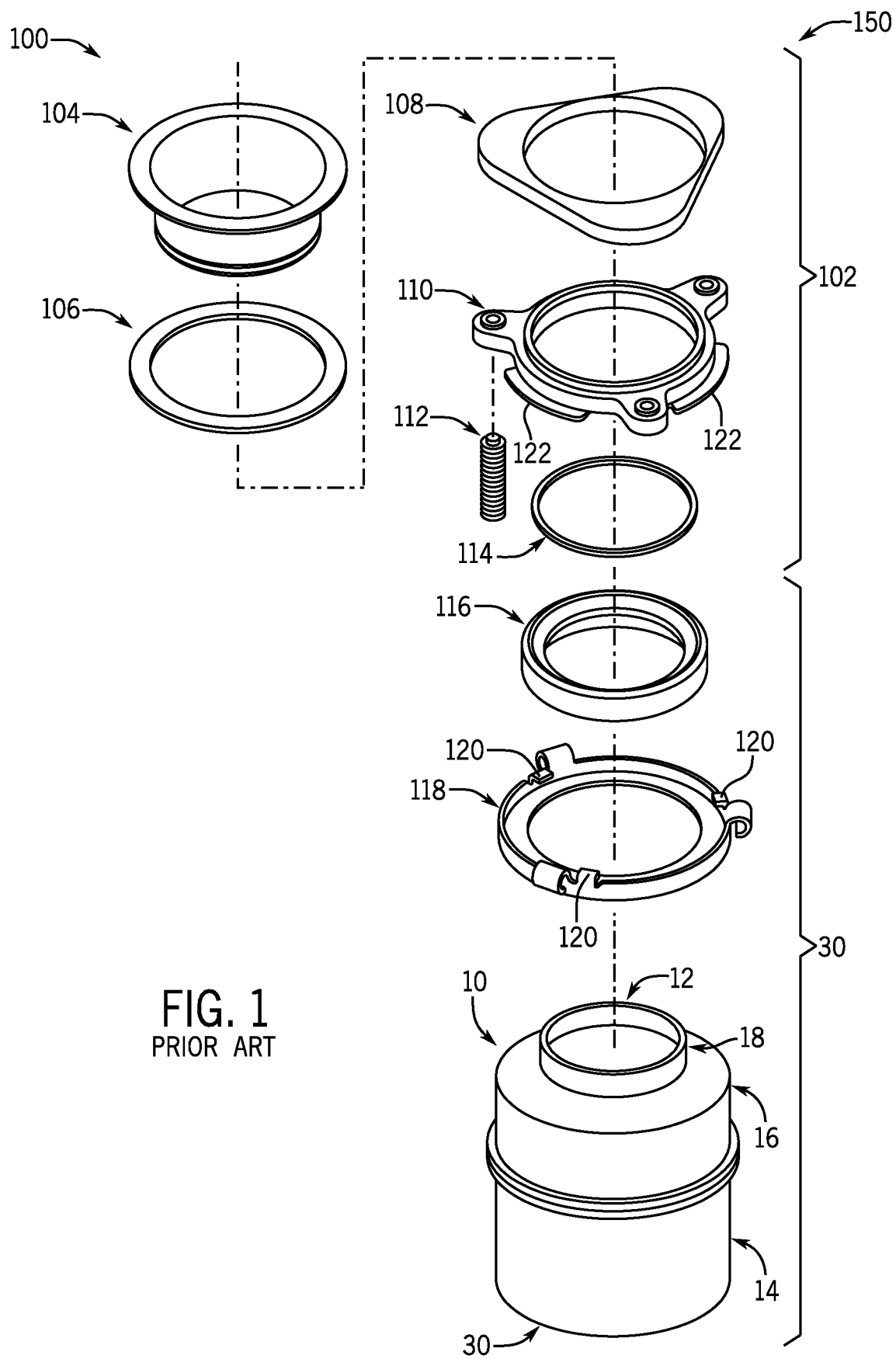
FIG. 1 is an exploded view of a Prior Art food waste disposer assembly including both a mounting assembly and a disposer assembly including a food waste disposer, as can be installed in relation to another structure such as a sink.
Figure 2:
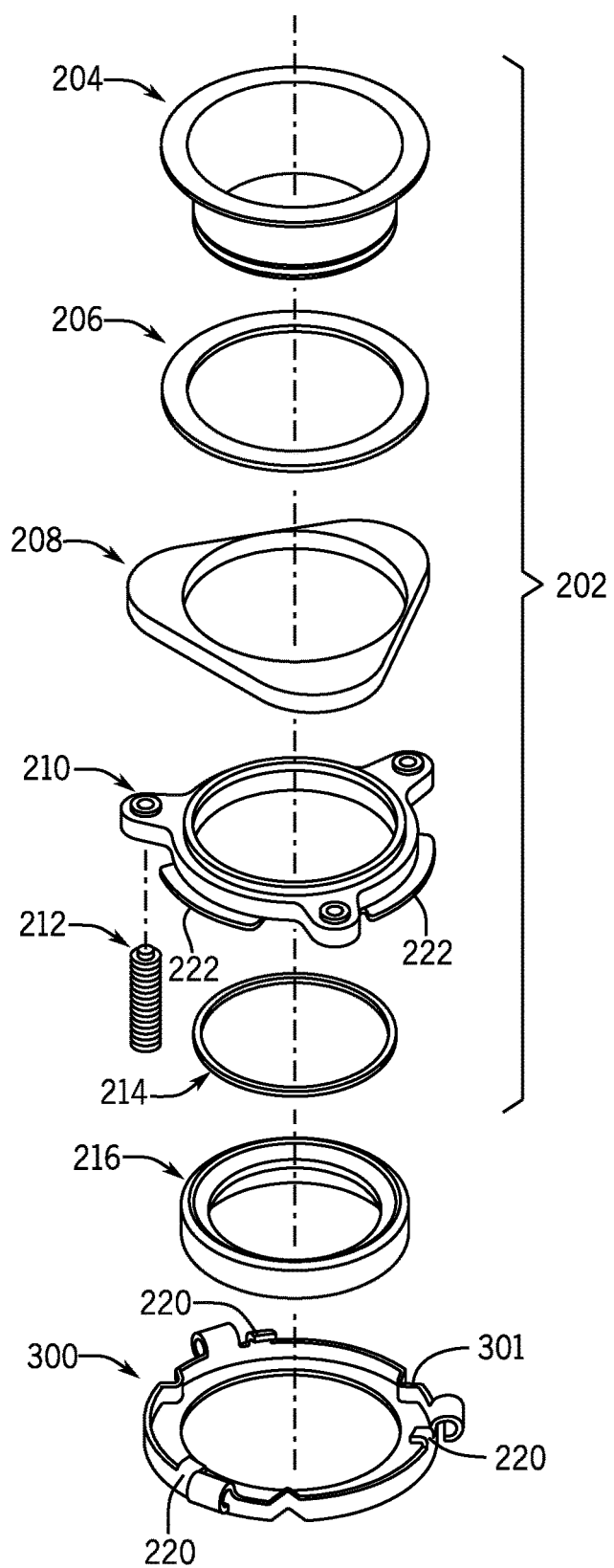
FIG. 2 is an exploded view of another Prior Art food waste disposer mounting assembly.
Figure 9:
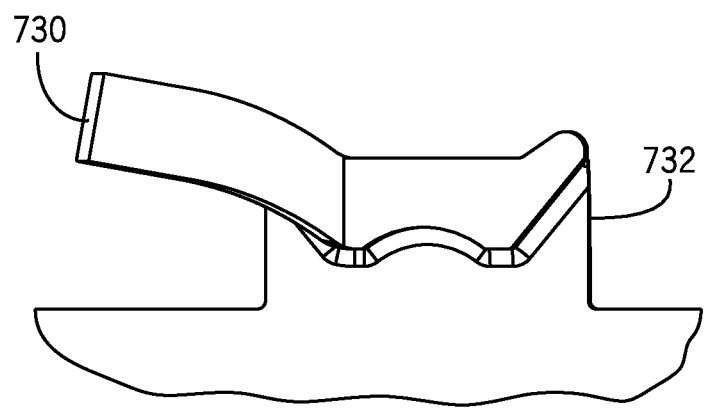
FIG. 9 illustrates a detail view of a third engagement structure of the engagement feature of FIG. 7.
Figure 10:
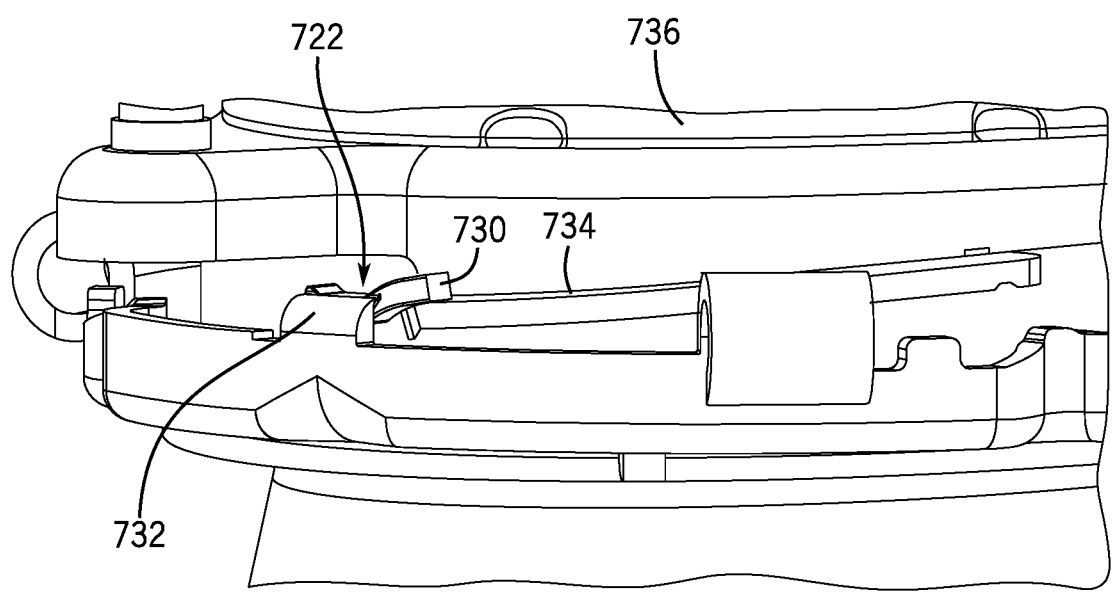
FIG. 10 illustrates the third engagement structure of FIG. 9 when the engagement feature of FIG. 7 is in its engaged position.

FIG. 9 provides a detail view of one extension arm 730 of the third engagement structure 722 of the engagement feature 700, and FIG. 10 illustrates the third engagement structure 722 when the engagement feature 700 is in its engaged position. Referring to FIGS. 7, 9, and 10, the body flange 704 has a plurality of ramp engagement tabs 732. The third engagement structure 722 includes an extension arm 730 provided on at least one of the ramp engagement tabs 732. In the illustrated example, each extension arm 730 has a generally arcuate shape that extends upwardly and outwardly from a ramp engagement tab 732. As can be seen in FIG. 10, when the engagement feature 700 is in its engaged position, each extension arm 730 of the third engagement structure 722 engages a portion of a ramp 734 of the upper mounting flange 736. Ramp 724 of the upper mounting flange 736 may correspond to the ramps 222 of the upper mounting flange as described above with reference to FIG. 2. While the third engagement structure 722 is illustrated herein as being a component of engagement feature 700, it should be understood that it could be incorporated into any of the other engagement features described herein.

Figure 11:
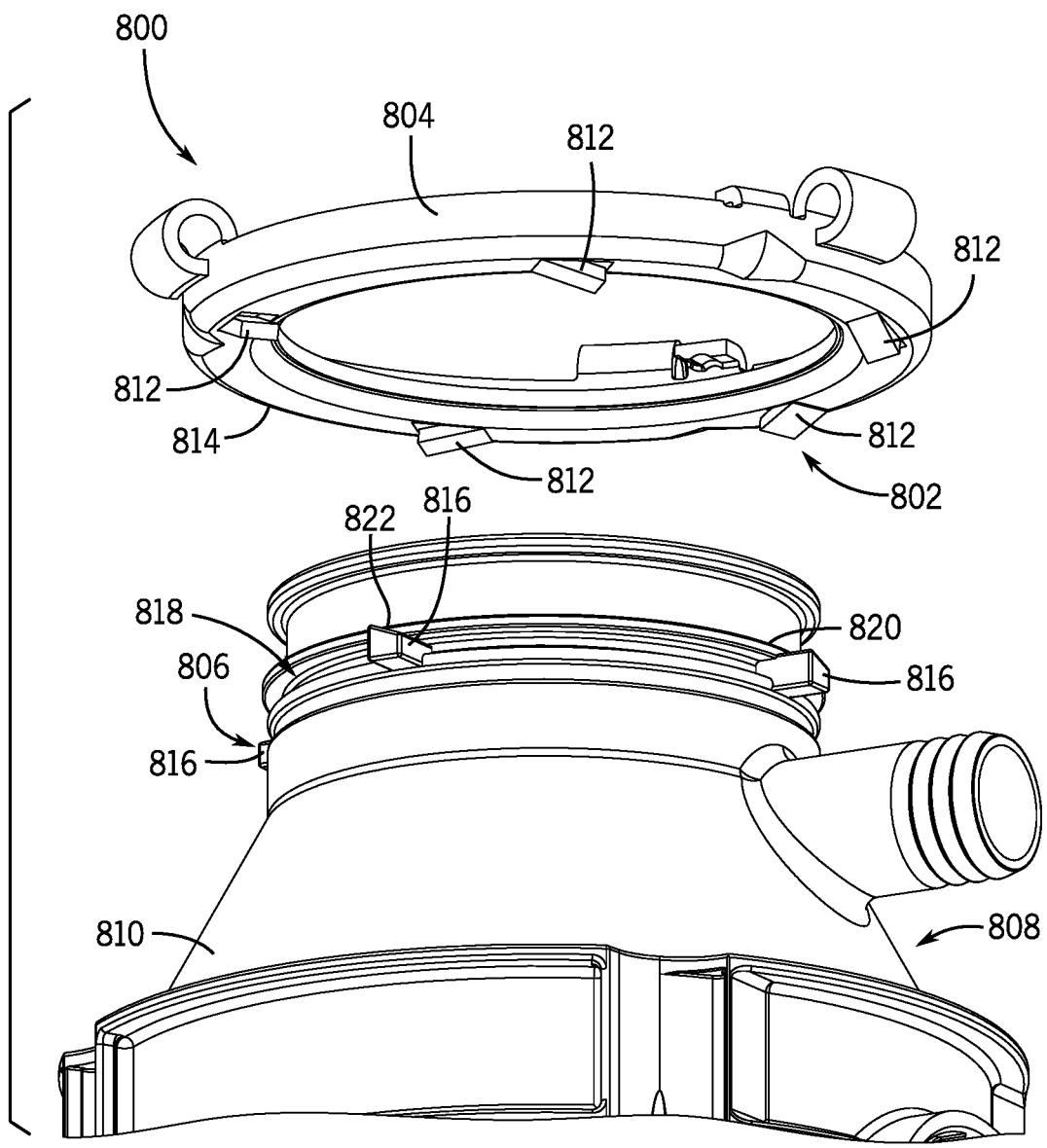
FIG. 11 illustrates an exploded view of a third example of an engagement feature of the present technology, prior to engagement of the engagement feature.
Figure 12:
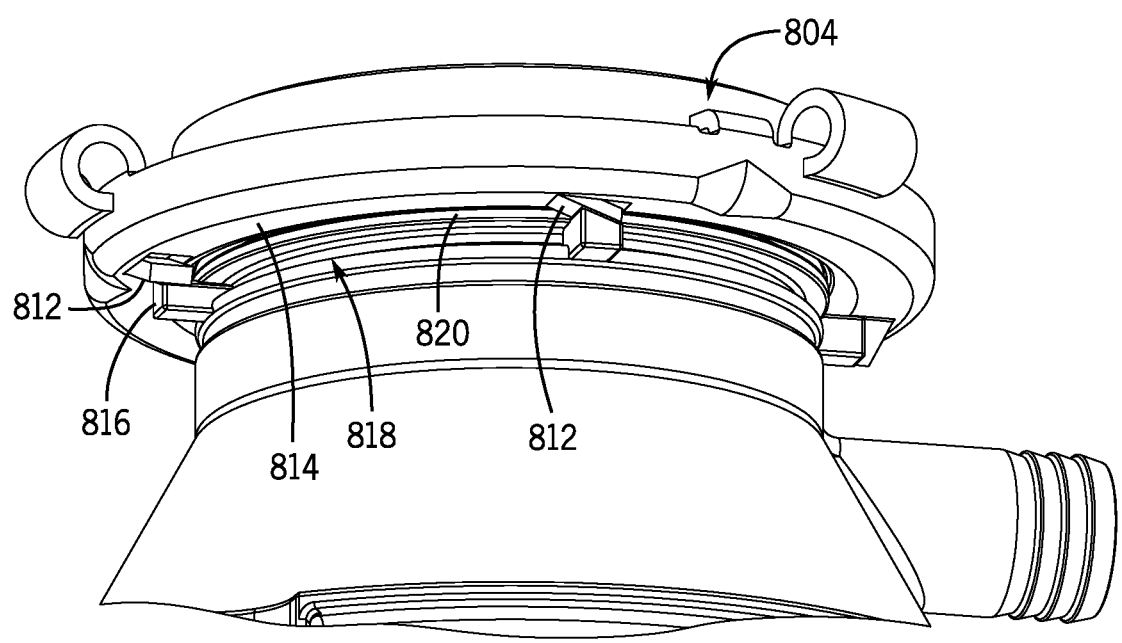
FIG. 12 illustrates the engagement feature of the FIG. 11, with the body flange abutting the circumferential support ring.

FIGS. 11 and 12 illustrate an engagement feature 800 of the present technology. The engagement feature 800 includes first engagement structure 802 located on the body flange 804 and a second engagement structure 806 located on the upper portion 808 of the disposer body 810.

The first engagement structure 802 includes one or more extension tabs 812 extending downwardly from a bottom surface 814 of the body flange 804. In the illustrated example, the first engagement structure 802 includes five extension tabs 812. The bottom surface 814 of the body flange 804 has a circumference, and the extension tabs 812 are spaced apart along the circumference of the bottom surface 814 of the body flange 804. In other examples, the first engagement structure 802 may include any suitable number of extension tabs 812, such as two, three, four, six, or a different plurality of extension tabs 812. The extension tabs 812 may or may not be evenly spaced along the circumference of the bottom surface 814 of the body flange 804. Each of the extension tabs 812 is shown as being generally triangular in shape, but may have any suitable shape. Preferably, each extension tab 812 has at least one sloped surface.

The second engagement structure 806 includes one or more protrusions 816 provided on the upper portion 808 of the disposer body 810. The upper portion 808 of the disposer body 810 may include a body flange support collar 818 that includes the one or more protrusions 816. The body flange support collar 818 may also include a circumferential support ridge 820, and the bottom surface 814 of the body flange 804 may abut the circumferential support ridge 820 of the body flange support collar 818 when the engagement feature 800 is in the engaged position. The one or more protrusions 816 of the second engagement structure 806 may each extend outwardly from the upper portion 808 of the disposer body 810, and may be located below the circumferential support ridge 820. The number, spacing, and shape of each protrusion 816 of the second engagement structure 806 should be selected to align with a corresponding extension tab 812 of the first engagement structure 802. In the illustrated example, each protrusion 816 has a sloped upper surface 822.

In practice, the user may place the body flange 804 so that the bottom surface 814 of the body flange 804 rests on the circumferential support ridge 820, as shown in FIG. 12. As the user lifts the unit and pushes it upward into the sink flange, the user may rotate the unit counter clockwise (looking from the top of the unit to the bottom). After a few degrees of rotation, the one or more extension tabs 812 of the first engagement structure 802 may become engaged with the one or more protrusions 816 of the second engagement structure 806. The design shown, or another sloped design, may cause the body flange 804 to be pushed upward as it gets tightened, which may allow the body flange 804 to be tightened more. Past a certain point of rotation, the one or more extension tabs 812 of the first engagement structure 802 and the one or more protrusions 816 of the second engagement structure 806 may become disengaged and, the disposer body may be rotated without tightening the body flange 804 anymore. At this point, the body flange 804 may be tightened enough to hold the unit's weight, and the disposer body 810 may be rotated for alignment with the piping under the sink.

Figure 13:
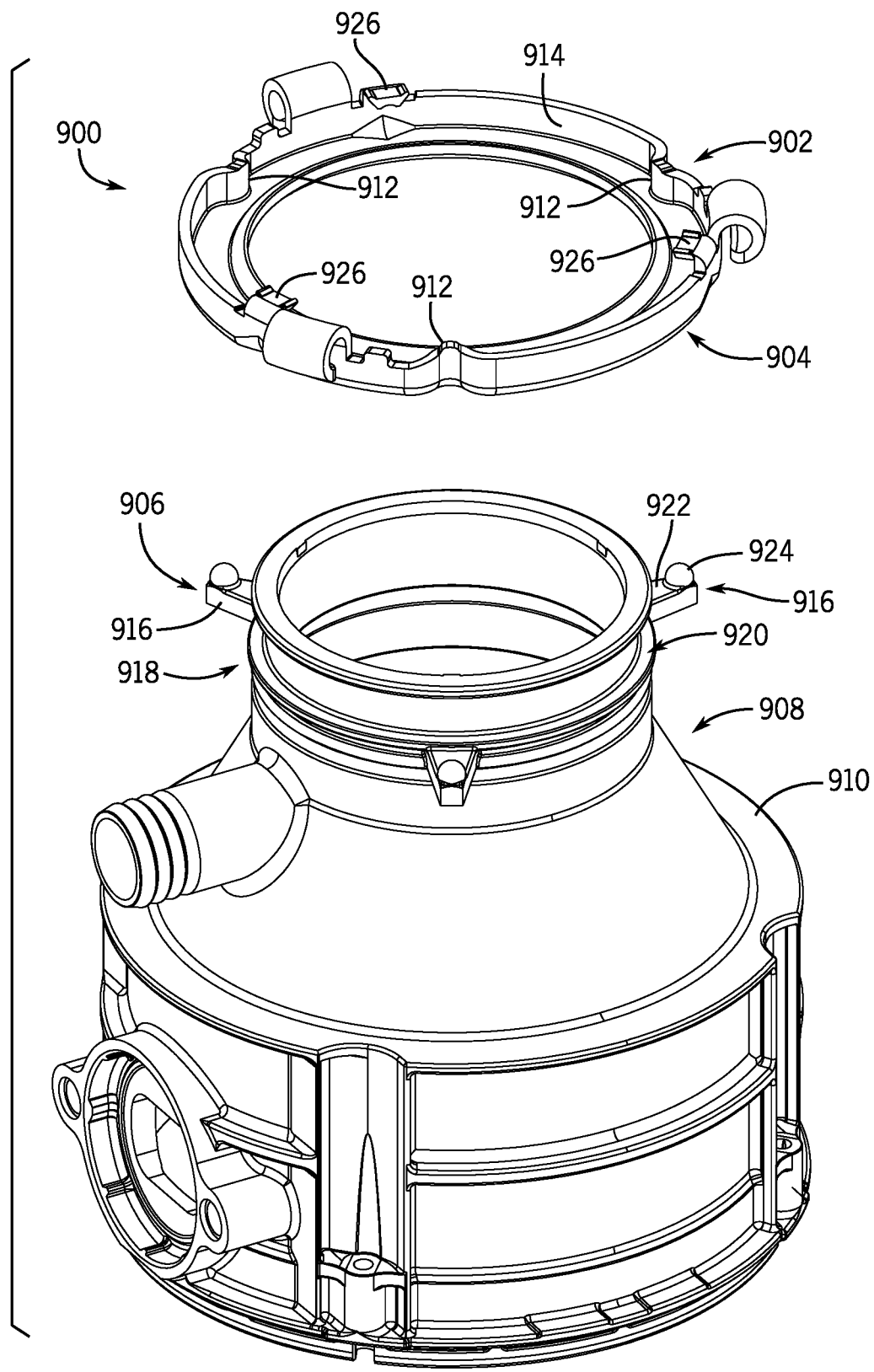
FIG. 13 illustrates an exploded view of a fourth example of an engagement feature of the present technology, prior to engagement of the engagement feature.
Figure 14:
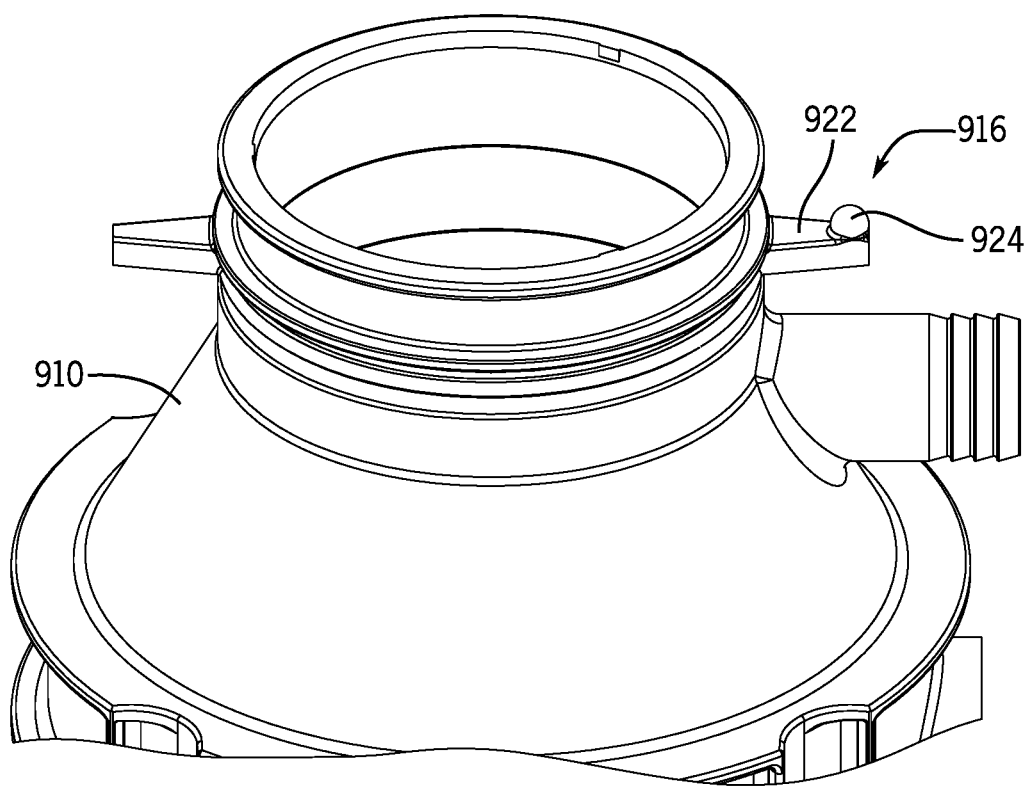
FIG. 14 illustrates an example of the engagement feature of FIG. 13, having a second engagement feature with only one protrusion.
Figure 15:
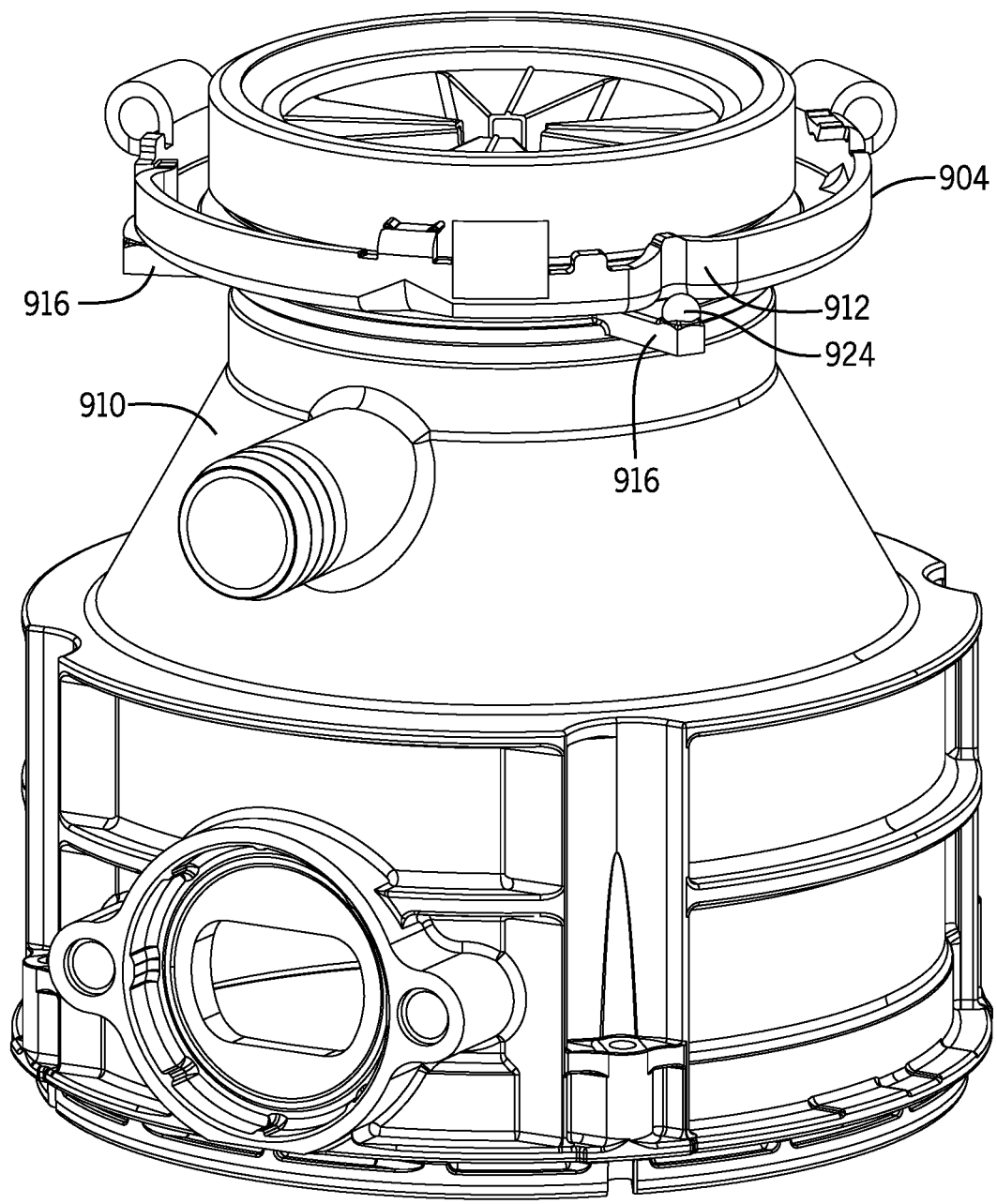
FIG. 15 illustrates the engagement feature of FIG. 13 in its engaged position.

FIGS. 13-15 illustrate an engagement feature 900 of the present technology. The engagement feature 900 includes first engagement structure 902 located on the body flange 904 and a second engagement structure 906 located on the upper portion 908 of the disposer body 910.

The first engagement structure 902 includes one or more notches 912 provided in the sidewall 914 of the body flange 904. Each notch 912 may be an indented shape formed in the sidewall 914, such as the V-shaped notches 912 as shown, or any other suitable indented shape, such as an arc. The shape of each of the notches 912 may be the same as or different from any of the other notches 912. In some examples the body flange 904 may have the same structure as the body flange 300 shown in FIG. 2, and the V-shaped notches 301 may act as the first engagement feature in addition to performing the function described in U.S. Pat. No. 913,990. In the illustrated example, the first engagement structure 902 includes notches 912 spaced apart along the circumference of the sidewall 914 of the body flange 904. In other examples, the first engagement structure 902 may include any suitable number of notches 912, such as one, two, four, five, or a different plurality of notches 912.

The second engagement structure 906 includes one or more protrusions 916 provided on the upper portion 908 of the disposer body 910. The upper portion 908 of the disposer body 910 may include a body flange support collar 918 that includes the one or more protrusions 916. The body flange support collar 918 may also include a circumferential support ridge 920, and the bottom surface 914 of the body flange 904 may abut the circumferential support ridge 920 of the body flange support collar 918 when the engagement feature 900 is in the engaged position. The one or more protrusions 916 of the second engagement structure 906 may each extend outwardly from the upper portion 908 of the disposer body 910, and may be located below the circumferential support ridge 920. The number, spacing, and shape of each protrusion 916 of the second engagement structure 906 should be selected to align with a corresponding notch 912 of the first engagement structure 902. In the example shown in FIGS. 13 and 15, the second engagement structure 906 includes three protrusions 916, which are configured to align with the three V-shaped notches 912. In the example shown in FIG. 14, the second engagement structure 906 only includes one protrusion 916. The second arm 922 may serve to keep the body flange level to facilitate engagement of the tabs 926 with the ramps. Each of the protrusions 916 as shown includes an arm 922 having an alignment post 924 at its distal end. The alignment posts 924 may be spherical or semi-spherical, as shown, or may have any other shape suitable to align with and be received by the notches 912.

In practice, when the engagement feature 900 is in the engaged position, the alignment post 924 of each protrusion 916 is received by a notch 912, as shown in FIG. 15. The disposer body 910 and body flange 904 can be lifted and rotated as an assembly. Once the tabs 926 of the body flange 904 engage with the ramps (e.g., 122 or 222) on the mounting flange, the disposer will be supported on the mounting flange and the first engagement feature 902 of the body flange 904 may separate from the second engagement feature 906 with further rotation. The disposer body 910 may then be rotated independently of the body flange 904 to complete the installation.

FIGS. 16-19 illustrate examples of engagement features of the present technology that include a coupling pin, which would not disengage automatically. Once the disposer is hung, the coupling pin could be manually removed and the disposer could then be aligned with the plumbing by turning the disposer.

Figure 16:
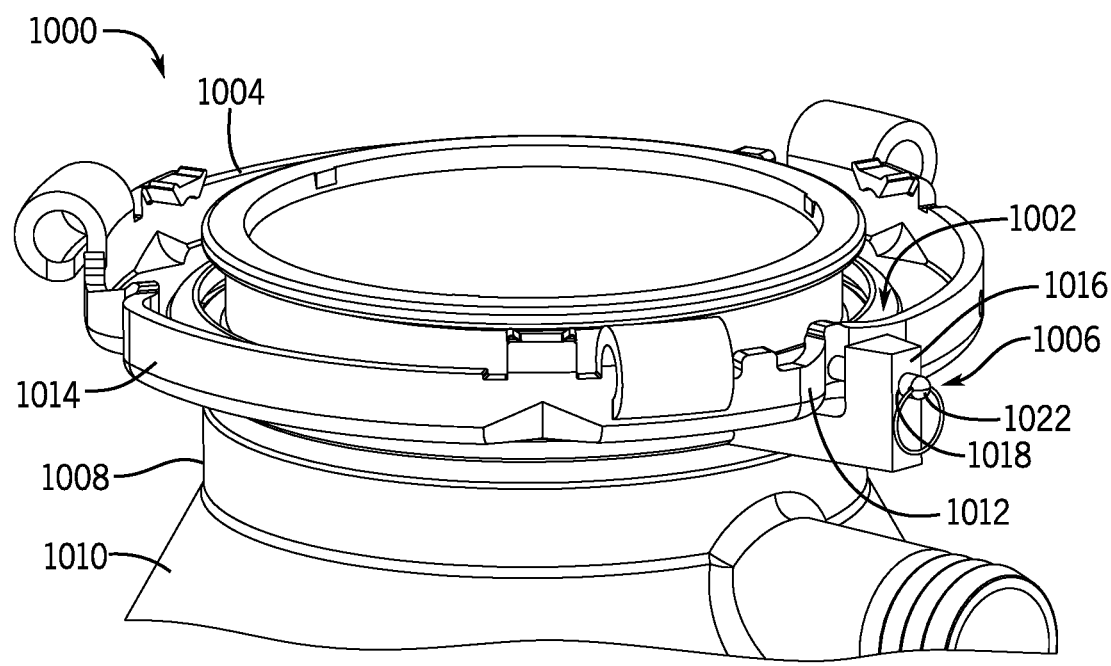
FIG. 16 illustrates a fifth example of an engagement feature of the present technology, with the engagement feature in the engaged position.

The engagement feature 1000 of FIG. 16 includes first engagement structure 1002 located on the body flange 1004 and a second engagement structure 1006 located on the upper portion 1008 of the disposer body 1010.

The first engagement structure 1002 includes one or more notches 1012 provided in the sidewall 1014 of the body flange 1004. Each notch 1012 may be an indented shape formed in the sidewall 1014, such as the V-shaped notches 1012 as shown, or any other suitable indented shape, such as an arc. The shape of each of the notches 1012 may be the same as or different from any of the other notches 1012. In some examples the body flange 1004 may have the same structure as the body flange 300 shown in FIG. 2, and one or more of the V-shaped notches 301 may act as the first engagement feature in addition to performing the function described in U.S. Pat. No. 913,990.

The second engagement structure 1006 includes one or more protrusions 1016 provided on the upper portion 1008 of the disposer body 1010. The one or more protrusions 1016 of the second engagement structure 1006 may each extend outwardly from the upper portion 1008 of the disposer body 1010. The number, spacing, and shape of each protrusion 1016 of the second engagement structure 1006 should be selected to align with a corresponding notch 1012 of the first engagement structure 1002. In the example shown in FIG. 16, the second engagement structure 1006 includes one protrusion 1016, which is configured to align with one of the V-shaped notches 1012. The protrusion 1016 as shown is L-shaped and has a pin receiving hole 1018. When the pin receiving hole 1018 is aligned with the notch 1012, the coupling pin 1020 can be placed, being received by the notch 1012 and the pin receiving hole 1018, causing engagement of the body flange 1004 with the disposer body 1010.

Figure 17:
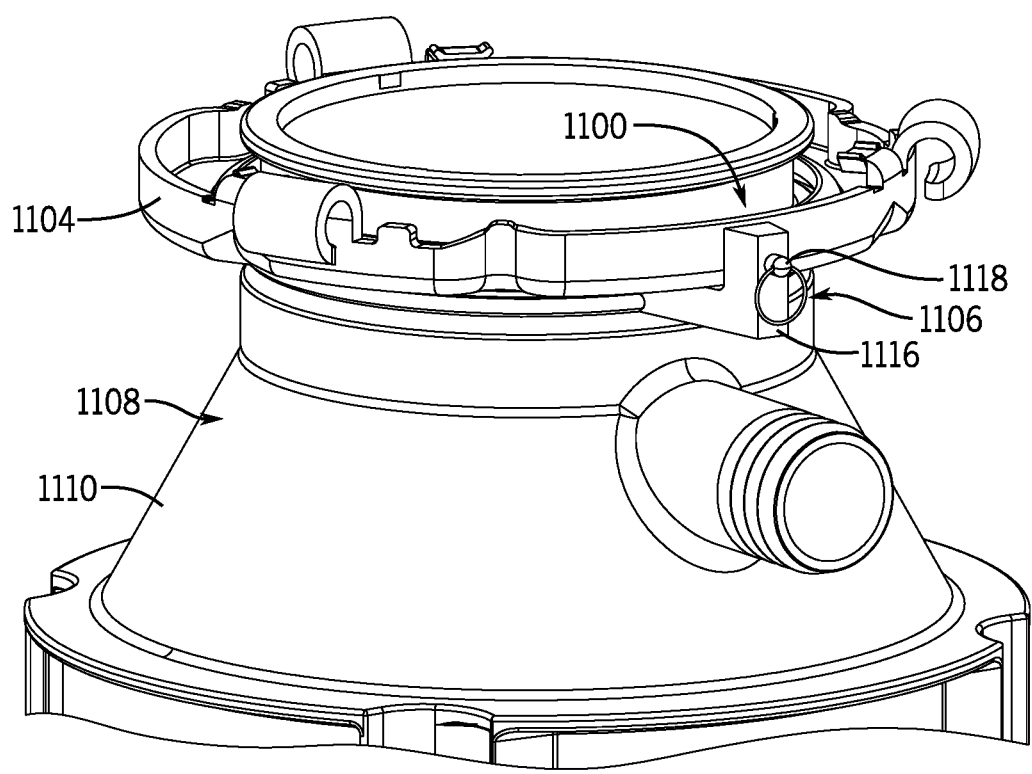
FIG. 17 illustrates a sixth example of an engagement feature of the present technology, with the engagement feature in the engaged position.
Figure 18:
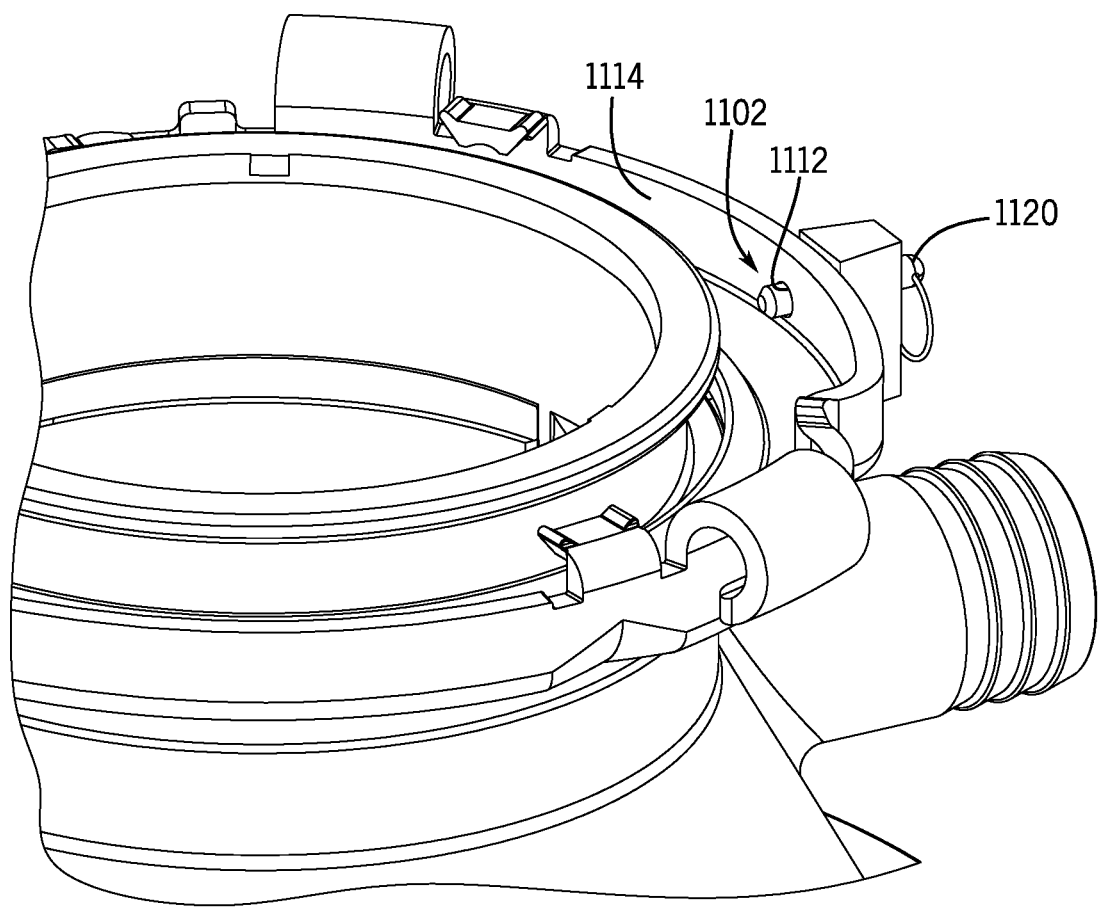
FIG. 18 illustrates another view of the engagement feature of FIG. 17.

The engagement feature 1100 of FIGS. 17-18 includes first engagement structure 1102 located on the body flange 1104 and a second engagement structure 1106 located on the upper portion 1108 of the disposer body 1110.

The first engagement structure 1102 includes one or more first pin receiving holes 1112 provided in the sidewall 1114 of the body flange 1104.

The second engagement structure 1106 includes one or more protrusions 1116 provided on the upper portion 1108 of the disposer body 1110. The one or more protrusions 1116 of the second engagement structure 1106 may each extend outwardly from the upper portion 1108 of the disposer body

1110. In the example shown in FIGS. 17-18, the second engagement structure 1106 includes one protrusion 1116, which is configured to align with one first pin receiving hole 1112. The protrusion 1116 as shown is L-shaped and has a second pin receiving hole 1118. When the second pin receiving hole 1118 is aligned with the first pin receiving hole 1112, the coupling pin 1120 can be placed, extending through both the first and second pin receiving holes, causing engagement of the body flange 1104 with the disposer body 1110.

Figure 19:
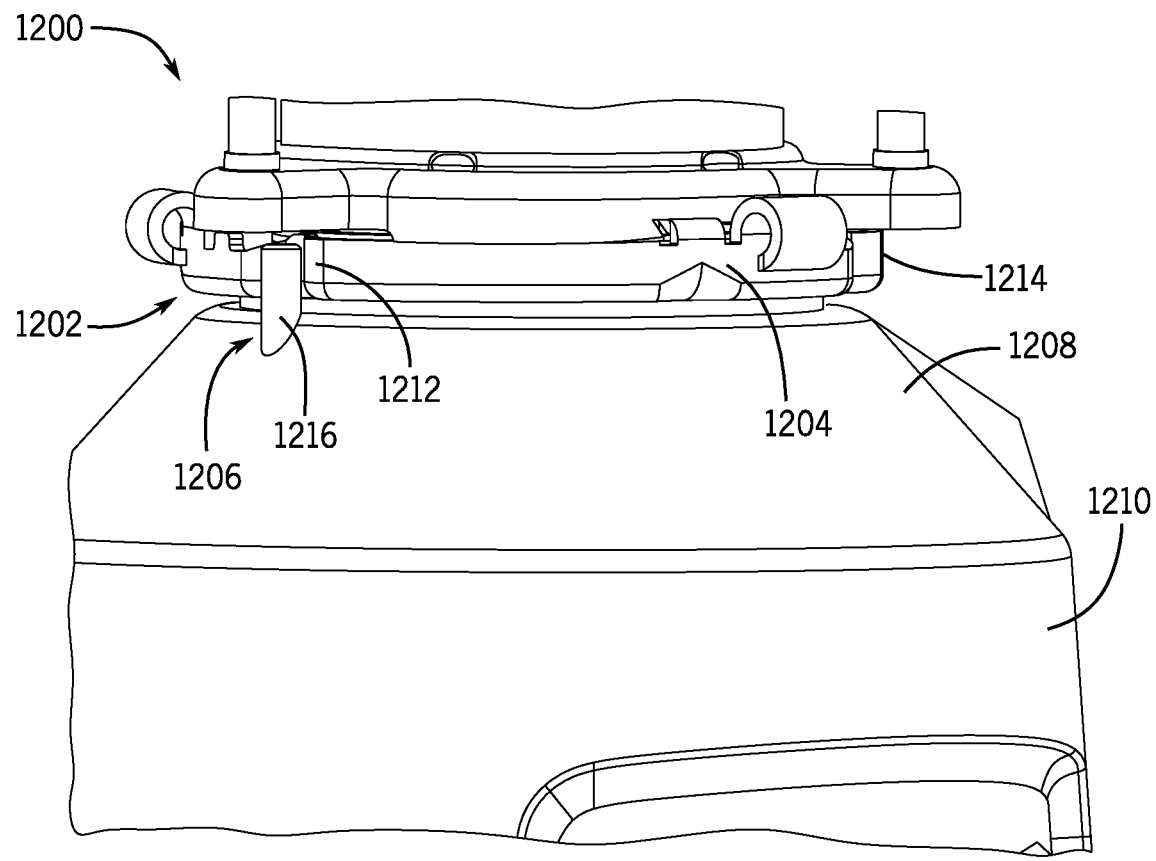
FIG. 19 illustrates a sixth example of an engagement feature of the present technology, with the engagement feature in the engaged position.

The engagement feature 1200 of FIG. 19 includes first engagement structure 1202 located on the body flange 1204 and a second engagement structure 1206 located on the upper portion 1208 of the disposer body 1210.

The first engagement structure 1202 includes one or more notches 1212 provided in the sidewall 1214 of the body flange 1204. Each notch 1212 may be an indented shape formed in the sidewall 1214, such as the V-shaped notches 1212 as shown, or any other suitable indented shape, such as an arc. The shape of each of the notches 1212 may be the same as or different from any of the other notches 1212. In some examples the body flange 1204 may have the same structure as the body flange 300 shown in FIG. 2, and one or more of the V-shaped notches 301 may act as the first engagement feature in addition to performing the function described in U.S. Pat. No. 913,990.

The second engagement structure 1206 includes at least one coupling post 1216 provided on the upper portion 1208 of the disposer body 1210. The at least one coupling post 1216 may extend vertically, or substantially vertically, upwards from the upper portion 1208 of the disposer body 1210.

When the engagement feature 1200 is in the engaged position, the at least one coupling post 1216 of the second engagement structure 1206 is aligned with and received by the at least one notch 1212 of the first engagement structure 1202. The body flange 1204 and the disposer body 1210 are thus engaged, and may be lifted and rotated as an assembly. Similarly to the embodiment shown in FIG. 13-15, in practice, once the body flange 1204 engages with the ramps (e.g., 122 or 222) on the mounting flange during installation, the disposer will be supported on the mounting flange and the first engagement feature 1202 of the body flange 1204 may separate from the second engagement feature 1206 with further rotation. The disposer body 1210 may then be rotated independently of the body flange 1204 to complete the installation.

Figure 20:
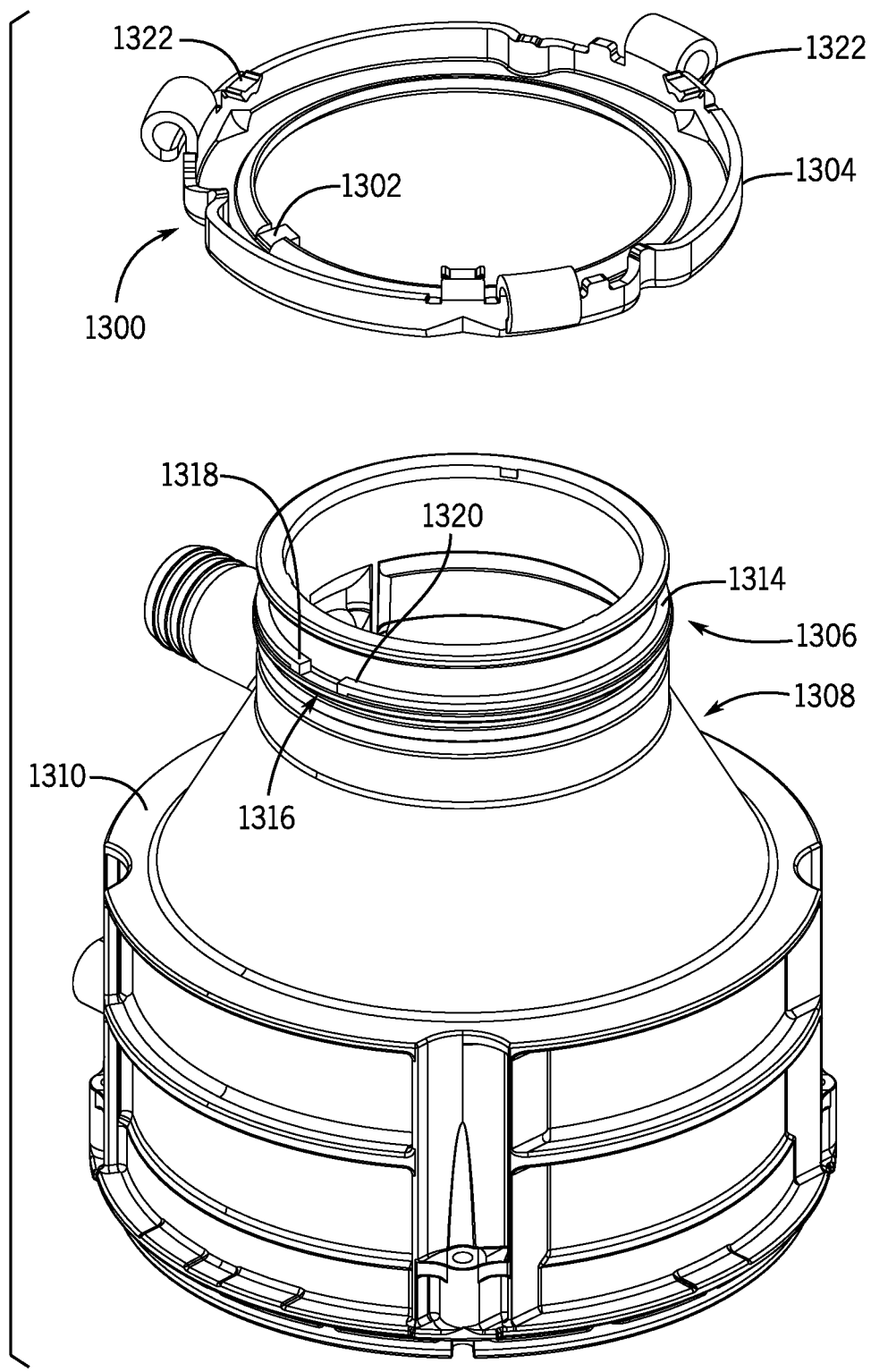
FIG. 20 illustrates an exploded view of a seventh example of an engagement feature of the present technology, prior to engagement of the engagement feature.
Figure 21:
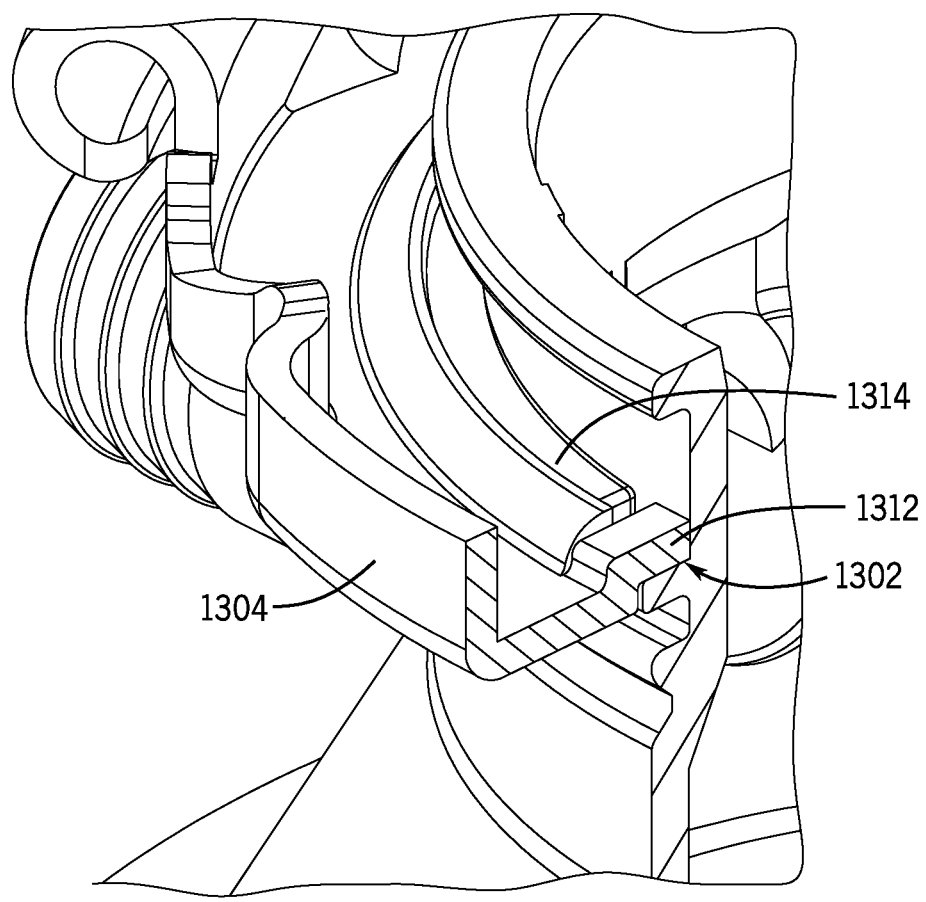
FIG. 21 illustrates a cut-away perspective detail view of the engagement feature of FIG. 20 in the engaged position.
Figure 22:
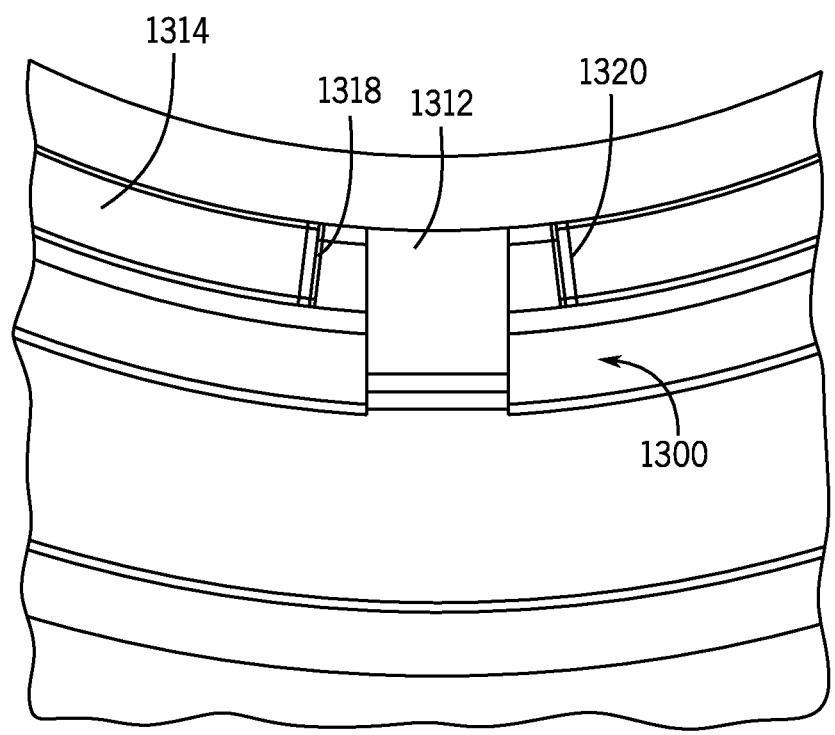
FIG. 22 illustrates a top detail view of the engagement feature of FIG. 20 in the engaged position.

FIGS. 20-22 illustrate an engagement feature 1300 of the present technology. The engagement feature 1300 includes first engagement structure 1302 located on the body flange 1304 and a second engagement structure 1306 located on the upper portion 1308 of the disposer body 1310.

The first engagement structure 1302 includes a protrusion 1312 that extends inwardly from the body flange 1304. The protrusion 1312 in the illustrated example is in the form or a rectangular tab. However, the protrusion 1312 could have any suitable shape that is configured to be received by the receiving space 1316, described below.

The second engagement structure 1306 includes a rib 1314 and a receiving space 1316. The rib 1314 is provided on the upper portion 1308 of the disposer body 1310. The rib 1314 extends circumferentially around a portion of the upper portion 1308 of the disposer body 1310, from a first location 1318 to a second location 1320 spaced apart from the first location. The receiving space 1316 is the space between the first location 1318 of the rib and the second location 1320 of the rib. In the illustrated example, the rib 1314 is configured such that the receiving space 1316 is located about 90° to the left of the front of the disposer body 1310. The receiving space 1316 is configured to receive the protrusion 1312 when the engagement feature 1300 is engaged.

In practice, when the engagement feature 1300 is in the engaged position, the protrusion 1312 of the first engagement structure 1302 is received by the receiving space 1316 of the second engagement structure 1306, as shown in FIGS. 21 and 22. The disposer body 1310 and body flange 1304 can be lifted and rotated as an assembly. The body flange may also include one or more tabs 1322 that are configured to engage with the ramps (e.g., 122 or 222) on the mounting flange. Once the tabs 1322 of the body flange 1304 engage with the ramps (e.g., 122 or 222) on the mounting flange, the disposer will be supported on the mounting flange and the first engagement feature 1302 of the body flange 1304 may separate from the second engagement feature 1306 with further rotation. The disposer body 1310 may then be rotated independently of the body flange 1304 to complete the installation.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A mounting assembly for mounting a waste disposer, the mounting assembly comprising:
    an engagement feature comprising a first engagement structure located on a body flange and a second engagement structure located on an upper portion of a disposer body;
    wherein the engagement feature has an engaged position in which the body flange and the disposer body are engaged and are rotatable as a unit, and a disengaged installed position in which the disposer body is rotatable independently of the body flange.

2. The mounting assembly of claim 1, wherein the first engagement structure comprises one or more holes provided in a bottom surface of the body flange.

3. The mounting assembly of claim 2, wherein the first engagement structure comprises a plurality of holes, the bottom surface of the body flange has a circumference, and the plurality of holes are spaced apart along the circumference of the bottom surface of the body flange.

4. The mounting assembly of claim 2, wherein the one or more holes have a configuration selected from the group consisting of: circular holes, punch-out tabs, and slots.

5. The mounting assembly of claim 1, wherein the first engagement structure comprises one or more extension tabs extending downwardly from a bottom surface of the body flange.

6. The mounting assembly of claim 5, wherein the bottom surface of the body flange has a circumference, the first engagement structure comprises a plurality of extension tabs, and the extension tabs are spaced apart along the circumference of the bottom surface of the body flange.

7. The mounting assembly of claim 5, wherein each extension tab has at least one sloped surface.

8. The mounting assembly of claim 1, wherein the first engagement structure comprises one or more notches provided in a sidewall of the body flange.

9. The mounting assembly of claim 1, wherein the second engagement structure comprises one or more protrusions provided on the upper portion of the disposer body.

10. The mounting assembly of claim 9, wherein the upper portion of the disposer body comprises a body flange support collar having top surface, and the second engagement structure extends above the top surface of the body flange support collar.

11. The mounting assembly of claim 9, wherein each protrusion extends outwardly from the upper portion of the disposer body.

12. The mounting assembly of claim 9, wherein each protrusion comprises an arm having a distal end, and an alignment post at the distal end.

13. The mounting assembly of claim 9, wherein each protrusion has a sloped upper surface.

14. The mounting assembly of claim 1, wherein the first engagement structure is aligned with and receives the second engagement structure when the engagement feature is in the engaged position.

15. The mounting assembly of claim 1, wherein the body flange comprises a plurality of ramp engagement tabs, and the engagement feature comprises a third engagement structure, the third engagement structure comprising an extension arm provided on at least one of the ramp engagement tabs, wherein the extension arm extends upwardly and outwardly from the ramp engagement tab.

16. The mounting assembly of claim 1, wherein the engagement feature is configured to maintain the engaged position during a first degree of rotation of the disposer body, and transition from the engaged position to the disengaged installed position upon a second degree of rotation of the disposer body.

17. The mounting assembly of claim 1, wherein the first engagement structure comprises a protrusion that extends inwardly from the body flange, and the second engagement structure comprises a rib and a receiving space;
wherein the rib extends circumferentially around a portion of the upper portion of the disposer body from a first location to a second location spaced apart from the first location and the receiving space is located between the first location of the rib and the second location of the rib.

18. A waste disposer assembly comprising:
a waste disposer having a disposer body, the disposer body including an upper portion and a lower portion;
a mounting assembly including an engagement feature, the engagement feature comprising a first engagement structure located on a body flange and a second engagement structure located on an upper portion of a disposer body;
wherein the engagement feature has an engaged position in which the body flange and the disposer body are engaged and are rotatable as a unit, and a disengaged installed position in which the disposer body is rotatable independently of the body flange.

19. The waste disposer assembly of claim 18, wherein the lower portion of the disposer body comprises one or more hand grips.

20. The waste disposer assembly of claim 18, wherein the engagement feature is configured to maintain the engaged position during a first degree of rotation of the disposer body, and transition from the engaged position to the disengaged installed position upon a second degree of rotation of the disposer body.

21. A method of mounting a waste disposer, the method comprising steps of:
providing a mounting assembly comprising an engagement feature, the engagement feature comprising a first engagement structure located on a body flange and a second engagement structure located on an upper portion of a disposer body;
placing the engagement feature in an engaged position in which the body flange and the disposer body are engaged and are rotatable as a unit;
rotating the disposer body through a first degree of rotation with the engagement feature in the engaged position; and
transitioning the engagement feature from the engaged position to a disengaged installed position.

22. The method of claim 21, wherein the step of transitioning is performed by rotating the disposer body through a second degree of rotation.

* * * * *